United States Patent [19]

McCormack

[11] Patent Number: 5,191,270
[45] Date of Patent: Mar. 2, 1993

[54] METHOD FOR STARTING A MOTOR

[75] Inventor: Mark J. McCormack, Phoenix, Ariz.

[73] Assignee: SGS-Thomson Microelectronics, Inc., Carrollton, Tex.

[21] Appl. No.: 711,919

[22] Filed: Jun. 7, 1991

[51] Int. Cl.$^5$ .............................................. H02P 1/18
[52] U.S. Cl. .................................... 318/254; 318/431
[58] Field of Search ............... 318/138, 254, 430, 431, 318/439, 728, 778

[56] References Cited

U.S. PATENT DOCUMENTS

| | | | |
|---|---|---|---|
| 4,992,710 | 2/1991 | Cassat | 318/254 |
| 5,001,405 | 3/1991 | Cassat | 318/254 |
| 5,012,166 | 4/1991 | Ushijima et al. | 318/254 |
| 5,028,852 | 7/1991 | Dunfield | 318/254 |
| 5,036,264 | 7/1991 | Ueki | 318/254 |
| 5,043,643 | 8/1991 | Hedlund et al. | 318/254 |

Primary Examiner—Bentsu Ro
Attorney, Agent, or Firm—Richard A. Bachand; Lisa K. Jorgenson; Richard K. Robinson

[57] ABSTRACT

A method for starting a polyphase motor of the type having a plurality of stator coils and a rotor includes the steps of measuring the rise time of current on each of the stator coils, determining from the rise time measurement the position of the rotor, and determining a coil to apply a voltage to produce maximum startup torque of the motor. Any position ambiguities are resolved by determining the direction of rotation of the motor by applying a voltage to the determined coil sufficient to produce at least a slight rotation of the rotor, remeasuring of the rise time of current on at least a plurality of the rotor coils, and determining a difference between the rise time measurement and remeasurement. The difference indicates the direction which the rotor was rotated.

14 Claims, 3 Drawing Sheets

METHOD FOR STARTING A MOTOR

BACKGROUND OF THE INVENTION

1. Field of the Invention

This invention relates to improvements in methods for starting polyphase motors, and more particularly to improvements for starting polyphase motors of which the initial position and starting direction are not known, or need to be controlled.

2. Description of the Prior Art

In many instances, the startup of a motor needs to be controlled. For example, in personal and other computers, disk drives, such as hard disk, so-called "floppy", and other disk drives, polyphase, brushless DC motors are frequently used. In such applications, the startup of the disk drive motor needs careful attention. With increased emphasis on the speed of operation of modern computers, it is, of course, desirable to bring the disk drive motor, and the disk (or disks, or other load) driven by the motor, up to operating speed as rapidly as possible. Two of the problems which need to be addressed are the determination of the initial position of the motor to enable a voltage to be applied which will result in maximum startup torque, and the determination of the direction of rotation in which the motor will start. However, in many recent disk drive designs, polyphase, typically 3-phase, brushless DC motors which have been finding widespread use, generally have no controls to insure the rotor stops at any particular position. It can therefore be seen that it would be desirable to determine the position of the rotor of the motor upon startup to determine the how a startup voltage should be applied to the stator windings to result in maximum startup torque to bring the motor, and the disk rotated by the motor, up to operating speed as rapidly as possible.

Typically, recent polyphase, 3-phase, brushless DC motors used in disk drives and sundry other systems, have a plurality of stator windings located in the interior portion of the motor, and a cylindrically shaped rotor which carries a plurality of permanent magnets which interact with the fields generated by the magnetic fields of the stator windings to produce a rotating torque to turn the rotor. Although the motor is referred to as a three phase motor, in practice a DC potential is sequentially connected to successive stator windings to provide the magnetic fields to interact with the magnetic fields of the rotor magnets to produce the desired rotation of the rotor.

One of the problems associated with such motor is that generally after operation the rotor stopping position is not known, and to restart the motor by the application of startup voltage in a random fashion may tend to initially start the motor in the wrong direction. This can be a major problem, especially, for instance in magnetic disk applications, in which large stiction forces may exist between the disk surface and the disk head, especially if the disk has been allowed to remain idle for extended periods of time. Such stiction forces can result in the head being moved in a backward direction, risking damage to both the disk and the head and drive components.

In the past, one way motors have been started is merely by a "start and go" method in which the stator coils are energized and allowed to carry the rotor up to speed without regard either to the initial phase of the voltage applied to the stator of the motor or to the initial position or rotation direction of the rotor. (It is noted that even if the motor does initially start rotation in the wrong direction, the motor stator field will always rotate in the correct direction, and will eventually correct the direction of rotation of the rotor; but not without risking possible component and disk damage in the meanwhile, as mentioned above.) Thus, the startup torque to which the motor started in this way experiences is fortuitous, depending upon the particular, random relationship between the rotor and the stator fields. The motor, therefore, is not necessarily brought up to operating speed as rapidly as possible, resulting in a slower system operation than might otherwise be possible.

Another method which has been used is a "brute force" method in which a known fixed (i.e., non-rotating) field is applied by the stator to force the rotor to a known position before the phase is allowed to change, or the operating voltages switched to the next phase, to begin the desired rotation. Techniques of this type make no provision for the initial direction of rotation of the rotor, and, in worst case, would require rotation of the rotor from a position 180° out of phase with respect to the desired starting position.

Another technique which has been used is to dynamically determine the position of the rotor as its rotation is begun. In such technique, typically the back emf induced in the stator coils upon rotation is measured, and the phase of the operating voltage adjusted, for example, by pulse width modulation or other techniques. However, since the back emf is directly proportional to the rotational velocity of the rotor, upon initial startup, the back emf is very small and difficult to reliably detect. And, of course, this technique requires rotation to enable its operation; consequently, the direction related problems mentioned above exist. Finally, as attempts are made to digitize computer operations to as large an extent as possible, generally the back emf is measured using digital techniques. But, as mentioned, especially at startup, the small signals are difficult to detect, and this adds additional concerns to digital signal processing.

Another technique which has been used is to apply a short burst of current to each set of stator coils, and measuring the amplitude of the current response. From this data, one of the current responses will be larger than the rest, enabling a stator coil to be determined to which a longer current pulse can be applied to start the motor in a desired manner. This process of applying pulse sets is continued until the motor reaches a predetermined RPM, after which other running techniques are employed. Such pulse set techniques, however, require wait times, due to data processing and the startup procedures themselves, and, therefore, result in less than maximum startup torque being achieved.

SUMMARY OF THE INVENTION

Accordingly, it is an object of the invention to provide a method for starting a polyphase motor with maximum torque in a desired direction of rotation.

It is another object of the invention to provide a motor startup method which reduces the time required to bring the motor to operating speed.

It is another object of the invention to provide a motor starting method of the type described which reduces the distance of rotor travel prior to actual startup.

It is still another object of the invention to provide a motor starting method of the type described which reduces the possibilities of component damage due to improper startup direction.

It is another object of the invention to provide a motor starting method of the type described which is particularly suitable for uses such as in computer disk drives, and the like, which brings the motor to desired rotational velocity as quickly as possible.

It is another object of the invention to provide a driver for starting a polyphase, brushless DC motor with maximum torque in a desired direction of rotation, in accordance with the method of a preferred embodiment of the invention.

It is another object of the invention to provide a motor system for uses such as disk drives in computer applications, and the like, which brings the motor and disk to desired rotational velocity as quickly as possible.

It is still another object of the invention to provide a driver for a brushless, 3 phase DC motor.

Thus, in accordance with a broad aspect of the invention, a method is presented for starting a polyphase motor of the type having a plurality of stator coils and a rotor includes the steps of measuring the rise time of current on each of the stator coils, determining from the rise time measurement the position of the rotor, and determining a coil to apply a voltage to produce maximum startup torque of the motor. Any position ambiguities are resolved by determining the direction of rotation of the motor by applying a voltage to the determined coil sufficient to produce at least a slight rotation of the rotor, remeasuring of the rise time of current on at least a plurality of the rotor coils, and determining a difference between the rise time measurement and remeasurement. The difference indicates the direction which the rotor was rotated.

In addition, a motor system, a computer disk drive system, a driver for polyphase brushless, DC motor are presented using the method in accordance with a preferred embodiment of the invention.

BRIEF DESCRIPTION OF THE DRAWINGS

The invention is illustrated in the accompanying drawing, in which.

In the various figures of the drawing, like reference numerals are used to denote like or similar parts.

DETAILED DESCRIPTION OF THE PREFERRED EMBODIMENTS

Figure 1:
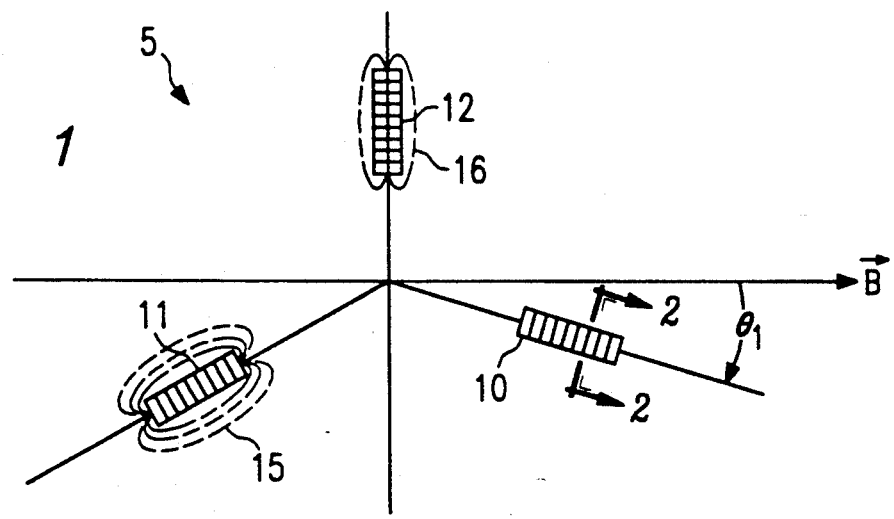
FIG. 1 is a diagrammatic view illustrating a top view of a portion of a three-phase motor and its relationship to a magnetic field, $\vec{B}$, in an initial startup position.

In accordance with a preferred embodiment of the invention, a method for starting a 3-phase motor of unknown initial rotor position is presented. A portion of such motor 5 is diagrammatically illustrated in FIG. 1. As shown, the motor has three stator windings or coils 10, 11, and 12 about the periphery of which a rotor (not shown) carrying a plurality of permanent magnets rotates. It should be noted that the invention is applicable to motors of various other configurations. Thus, although one motor embodiment, as described in detail, with which the invention can be preferably practiced has centrally located stator windings, and a cylindrically shaped permanent magnet rotor (not shown) surrounding and rotating about the periphery of the stator, the invention can be equally advantageously applied to motors with internally rotating permanent magnet rotors, rotors with magnetic field generating coils, and the like, as will be apparent to those skilled in the art. Also, although only three coils 10-12 are shown, it is understood that the invention can be equally advantageously employed with respect to other motors having different numbers and designs of coils.

With reference again to FIG. 1, the stator coils 10-12 have an initial rotational displacement angle $\theta_1$ with respect to the $\vec{B}$ field of the motor 5. It will be appreciated that with respect to each of the coils 10-12, the coefficient of self inductance can be represented by the following equation:

$$L = \frac{N\Phi}{i}$$

Where:
L = coefficient of self inductance;
N = number of turns of the coil;
i = current through coil; and
$\Phi$ = magnetic flux.

It is noted that the $\Phi$ magnetic flux is produced by the permanent magnets of the rotor surrounding the coils of the stator, and may be in any direction, depending upon the position of the stator in its stopped position. However, as will be apparent, the actual direction of the $\Phi$ magnetic flux need not be exactly determined in order to determine to which of the stator windings a startup voltage needs to be initially applied to produce maximum startup torque in the motor.

Moreover:

$$L = \frac{v}{\frac{di}{dt}}$$

Figure 2:
FIG. 2 is a side view taken at 2—2 in FIG. 1 of one of the coils illustrated in FIG. 1.
Figure 3:
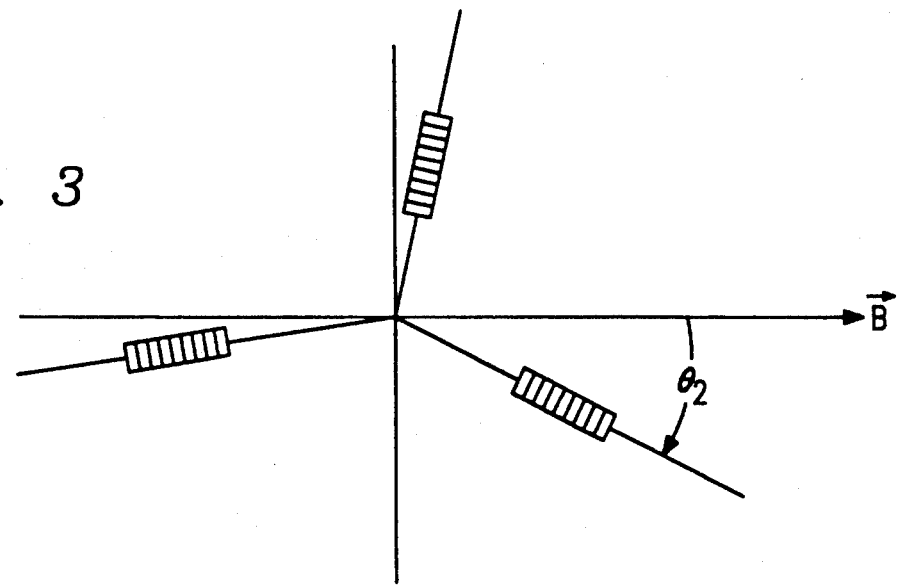
FIG. 3 is a diagrammatic view of the motor of FIG. 1, in a startup position after an initial movement.

Since N and i remain constant, it can be said that $L \propto \Phi$ and $\Phi = |\vec{A}||\vec{B}|\cos\theta_1$ where $\theta_1$ is the angle that the $\vec{B}$ field makes with a line normal to the coil (i.e. to the loops), and $\vec{A}$ is the area of an individual loop, as shown in FIG. 2.

$$\therefore L \propto \vec{B}\cos\theta_1$$

For a typical iron core inductor, in no external $\vec{B}$ field, the magnetic flux in the core is limited by the saturation of the core.

On the other hand, when an iron core inductor is immersed in an external $\vec{B}$ field, the magnetic flux density of the core becomes the sum of the external $\vec{B}$ field plus the magnetic flux density which is induced by the application of current through the coil.

Since the magnetic flux density within the core is limited by core saturation, if a current is applied to the coil such that the coil is held just at or below the saturation point, the application of an external $\bar{B}$ field will tend to modulate the saturation of the core, since the inductance is proportional to the magnetic flux. Thus, the (di/dt) will change as the core moves in and out of saturation. Stated another way, the self inductance or the coil is dependent upon its relative angular position with respect to the external $\bar{B}$ field.

This is illustrated generally, again with reference to FIG. 1, in which the magnetic flux surrounding each coil is dependent upon its orientation with respect to the $\bar{B}$ field. Thus, there are more magnetic lines of flux 15 of the coil 11, which is nearly normal to the $\bar{B}$ field, than there are lines of flux 16 of the coil 12, which is nearly aligned with the $\bar{B}$ field. (A similar magnetic flux condition exists also with respect to the coil 10, but the lines of flux are not shown in the drawing for purposes of clarity.) This condition can be electrically seen by measuring the rise time of a current in each of the respective coils. When a voltage is applied, for example, to coil 15, having a larger self inductance, the rise time of the current would be less than that which would be observed when a voltage is applied to coil 12, having a lower self inductance.

Figure 5:
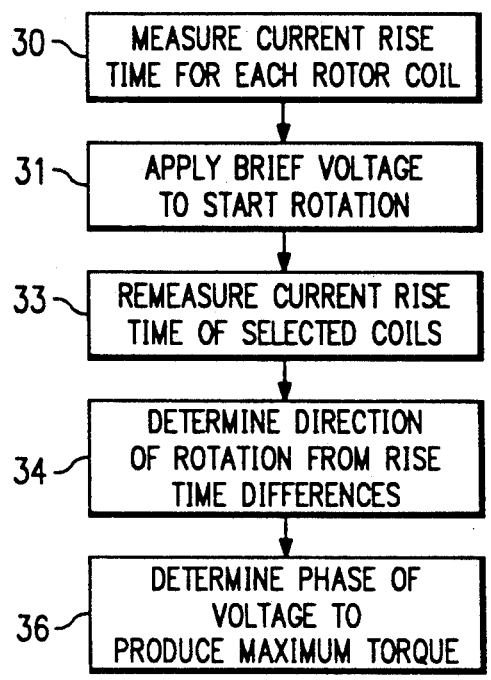
FIG. 5 is a box diagram showing the steps for starting a polyphase motor, in accordance with a preferred embodiment of the invention.

The first step, therefore, in determining the position of the motor, as shown in box 30 of FIG. 5, is to measure the rise time of the current in each of the coils 10–12 resulting from application of a known voltage to each in a constant $\bar{B}$ field. At this point, generally the coil which is most nearly aligned with the field (the $\bar{B}$ field being most nearly aligned with a line perpendicular to the loops of the coil) can be determined. This is the coil to which voltage can be applied to produce maximum start up torque. The manner by which the coil is identified is by identifying the coil which has a rise time between that of the other two coils. For example, in the best case, one coil, for example coil 12 in FIG. 1, will be aligned with the $\bar{B}$ field of the motor. The other two coils, 11 and 10 will have their coils aligned in opposition of or in support of the $\bar{B}$ field, and with therefore have current rise times respectively smaller and larger than the rise time of the current in coil 12.

The rise time measurements can be easily performed by known techniques, for example, by applying a step constant current to each of the coils and measuring or observing the time required for the current to rise to a predetermined value. This can be done using analog techniques, or, preferably, using digital processing techniques. The magnitude and duration of the constant current step will depend upon the size and type of the motor being considered, but should not be of sufficient magnitude to initiate motion of the parts of the motor. In some applications, it may be desirable to drive the coils completely into saturation; however, this is not absolutely essential to practice the method of the invention.

Points of ambiguity in the position of the rotor might appear to exist, for instance, when the rotor is on one of two positions such that the magnetic lines of flux of one of the coils are aligned with the $\bar{B}$ magnetic field. In that case, the current rise time of the non-aligned coils will be equal. In such instances, however, the direction of the coils of the aligned coil will either cause magnetic flux in the coil to be developed in opposition to or in support of the $\bar{B}$ magnetic field; therefore, the direction can be determined by, for example, a look up table for known (di/dt) values, or other technique. Thus, with a measurement approach such as the one described it is possible to determine which coil of a 3 phase DC motor should be energized to provide maximum torque at start up.

At this point, although the position of the motor can be generally established (with possible ambiguities, as above described), the problem remains that the direction of rotation is not known from the information developed so far. To determine the direction in which the motor will start, as shown in FIG. 5, box 31, the motor is energized with a short pulse of current, enough to displace the motor only slightly, but not a sufficient amount which might cause damage to any parts which might be associated with the motor. A new (di/dt) measurement is then made and compared with the previous one, box 33. From this information it can be determined in which direction the motor will move, box 34, and therefore be useful in determining the correct phase energization, (i.e., which stator coil to apply the initial start up voltage) to ensure proper rotation direction at start up box 36.

Figure 4A:
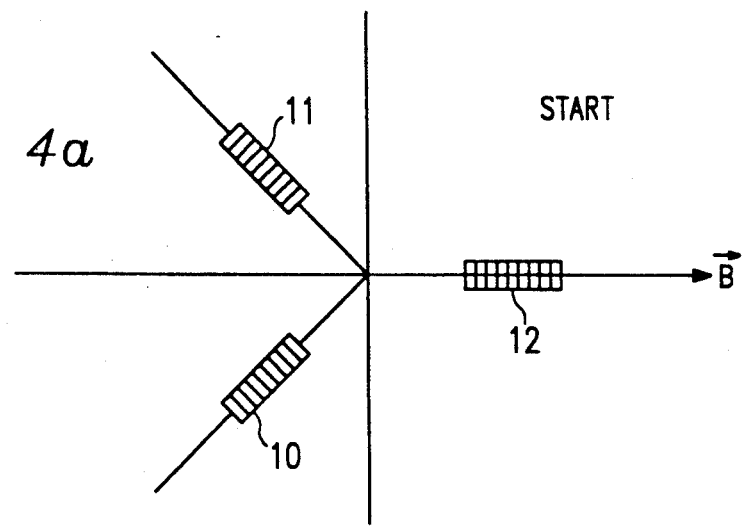
FIGS. 4a–4c are diagrammatic views of a motor in various rotational positions, illustrating the method, in accordance with a preferred embodiment of the invention, for determining the direction of rotation of the motor.
Figure 4B:
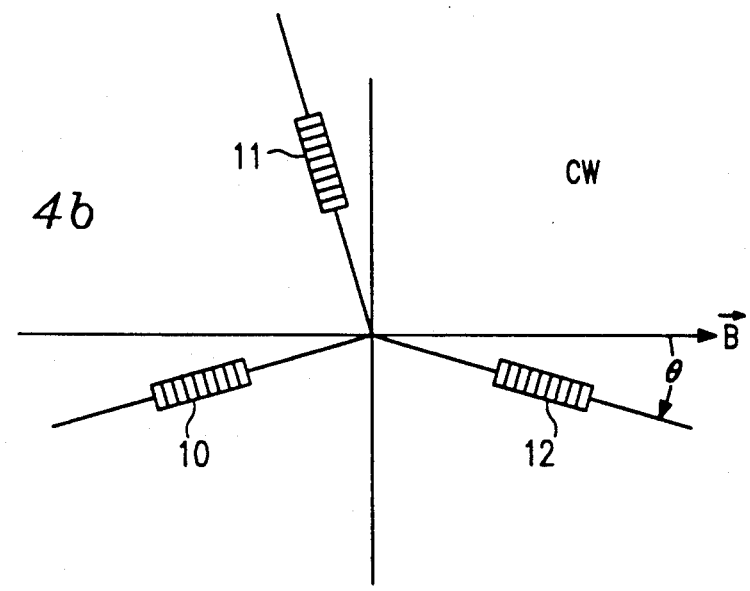
Figure 4C:
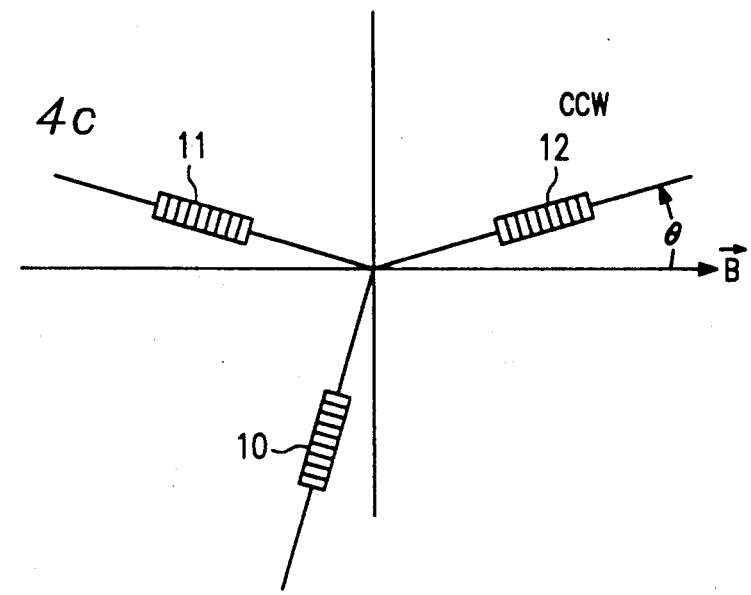

With reference now to FIGS. 4a–4c, an example of the direction determining method is shown. If the motor starts out, for example, in the position illustrated in FIG. 4a, it can be seen that the direction of the lines of magnetic flux of coil 12 are generally aligned with the magnetic $\bar{B}$ field. (Although only a single starting position is illustrated, a similar analysis can be demonstrated for other arbitrary starting positions, as well.) The lines of magnetic flux of coils 10 and 11 will produce substantially identical (di/dt) values. If the position of the motor is moved clockwise slightly, for example, an angle $\theta_1$, then the (di/dt) produced in the coil 10 would have increased from the original value, and the (di/dt) produced in the coil 11 would have decreased from the original value. From this data, it can be concluded that the motor was rotated clockwise. On the other hand, if, as shown in FIG. 4c, the motor was rotated an angle $\theta_1$ counter clockwise, the (di/dt) produced in the coil 10 would have decreased from the original value, and the (di/dt) produced in the coil 11 would have increased from the original value. It should be noted that measurements need not be taken in each of the coils 10–12. In the case of a motor having three coils, as shown, it is sufficient to measure the (di/dt) only of two of the three. Similar considerations exist occur, of course, in motors having different numbers of coils.

When the direction of rotation is established, the stator coil to which the operating voltage should be first applied can be determined, without ambiguity which might otherwise exist, depending upon the actual rotational position of the rotor.

It can therefore be seen that in accordance with a preferred embodiment of the invention only two steps are required, in contrast to the multiple steps of the prior art, in order to initiate the startup of the motor. Accordingly, the motor can be brought to operating speed more rapidly, with assurance that its direction of rotation is proper.

Figure 6:
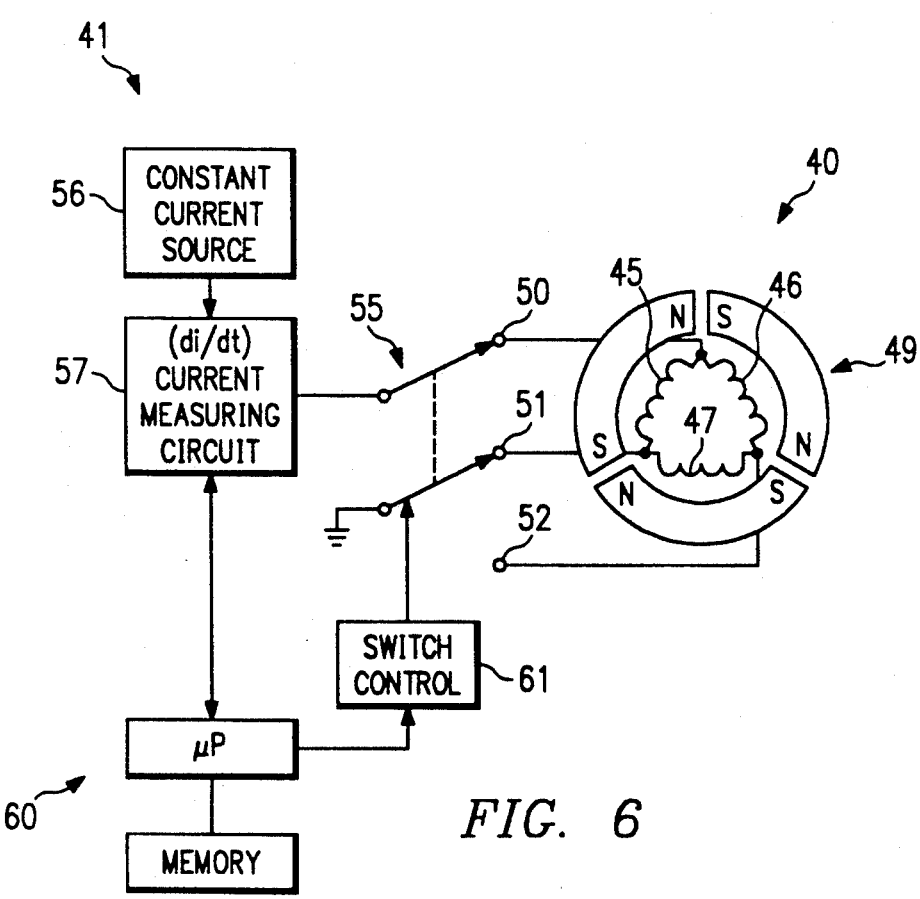
FIG. 6 is a box diagram of a motor system in which the method, in accordance with a preferred embodiment of the invention, may be practiced.

A system, in simplified form, in accordance with a preferred embodiment of the invention, is shown in FIG. 6. The system includes a motor 40, for example, a 3 phase, brushless DC motor, and a motor driver circuit 41. As shown, the motor 40 has internal stator windings 45, 46, and 47, and a surrounding permanent magnet rotor 49. The interconnection nodes of each coil 45–47 has a connection to a switch terminal 50, 51, and 52, as shown. A two pole switch 55, selects in sequence between terminals 45-46, 46-47, and 47-45 to connect the corresponding coil into a circuit with a constant current source 56. In each position, a current measuring circuit 57 measures the (di/dt) of produced by the coil in the circuit.

Preferably a programmed microprocessor 60, controls the switch 55 by a switch control circuit 61, and also receives data from the current measuring circuit 57. Thus, as the (di/dt) of each coil is measured, in sequence, the microprocessor 60 can analyze the (di/dt) produced, and determine which of coil 45-47 should be energized for maximum torque. As mentioned, this measurement can be by a two step method, first determining a maximum torque producing coil, followed by resolving any position ambiguities after a slight rotor rotation.

Moreover, the microprocessor 60 can also be programmed to determine, for example, if an error algorithm should be performed in the event the motor actually begins to rotate in the wrong direction.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for determining the direction of starting rotation of a polyphase motor of the type having a plurality of field coils and a rotor, comprising the steps of:
   making a first measurement the rise time of current on each of said field coils with the rotor at rest;
   applying a voltage to said motor sufficient to produce at least a slight rotation of said rotor;
   making a second measurement of the rise time of current on at least two of said field coils with the rotor again at rest;
   determining a difference between said first and second rise times measurements,
   determining from said rise time difference the direction which the rotor rotated.

2. The method of claim 1 wherein said steps of making a first measurement of the rise time of current on each field coil, making a second measurement of the rise time of current on at least two of the field coils, determining a difference between said first and second rise time measurements, determining from said rise time difference the direction which the rotor was rotated, comprise a programmed microprocessor for providing these steps.

3. A method for starting a polyphase motor of the type having a plurality of stator coils and a rotor, comprising the steps of:
   measuring the rise time of current on each of said stator coils with the rotor at rest;
   then causing said rotor to be rotated at least slightly to a different position;
   remeasuring of the rise time of current on at least a plurality of said stator coils with the rotor again at rest;
   determining a difference between said rise time measurement and remeasurement;
   determining from said difference the direction which the rotor was rotated;
   determining from said rise time measurement a stator coil to apply a voltage to produce maximum startup torque of the motor;
   and applying a startup voltage to said determined stator coil.

4. The method of claim 3, wherein said step of causing said rotor to be rotated at least slightly comprises the step of applying a voltage to said determined coil sufficient to produce at least a slight rotation of said rotor.

5. The method of claim 3 wherein said step of determining a coil to apply a voltage to produce maximum startup torque of the motor comprises determining from said current rise time measurements a coil having a current rise time which is intermediate the rise time of at least two other coils.

6. A method for starting a polyphase motor of the type having a plurality of field coils and a rotor, comprising the steps of:
   making a first measurement the rise time of current on each of said field coils with the rotor at rest;
   applying an voltage to said motor sufficient to produce at least a slight rotation of said rotor;
   making a second measurement of the rise time of current on at least two of said field coils with the rotor again at rest;
   determining a difference between said first and second rise times measurements;
   determining from said rise time difference the direction which the rotor rotated,
   determining from said rise time difference and the direction which the rotor rotated which field coil to apply an operating voltage to produce maximum startup torque to the motor
   and applying an operating voltage to said determined field coil.

7. A motor system comprising:
   a polyphase, brushless, DC motor, having a plurality of stator coils and a rotor;
   means for measuring the rise time of current on each of said stator coils with the rotor at rest; and
   means for causing the rotor of said motor to be rotated at least slightly;
   means for remeasuring of the rise time of current on at least a plurality of said stator coils with the rotor again at rest;
   means for determining a difference between said rise time measurement and remeasurement;
   means for determining from said difference the direction which the rotor was rotated;
   means for determining one of said stator coils to apply a startup voltage based upon said rise time measurement;
   and means for applying a startup voltage to said determined one of said stator coils.

8. The motor system of claim 7 wherein said means for causing the rotor of said motor to be rotated at least slightly comprises means for applying a voltage to said determined coil after the rise time of current on each of said stator coils has been measured sufficient to produce at least a slight rotation of said rotor.

9. The motor system of claim 7 wherein said means for determining one of said stator coils to apply a startup voltage, means for remeasuring the rise time of current, means for determining a difference between said rise time measurement and remeasurement, and means for determining from said difference the direction which the rotor was rotated comprises a programmed microprocessor.

10. A computer disk drive system comprising:
a polyphase, brushless, DC motor, having a plurality of stator coils and a rotor for rotating a computer memory disk;
means for measuring the rise time of current on each of said stator coils with the rotor at rest;
means for applying a voltage to a determined coil after the rise time of current on each of said stator coils has been measured with the rotor at rest, sufficient to produce at least a slight rotation of said rotor;
means for remeasuring of the rise time of current on at least a plurality of said stator coils with the rotor again at rest;
means for determining a difference between said rise time measurement and remeasurement, and
means for determining from said difference the direction which the rotor was rotated;
means for determining one of said stator coils to apply a startup voltage;
and means for applying a startup voltage to said determined one of stator coils.

11. The computer disk drive system of claim 10 wherein said computer memory disk is a disk carrying magnetic memory media.

12. The computer disk drive system of claim 10 wherein said means for determining one of said stator coils to apply a startup voltage, means for remeasuring the rise time of current, means for determining a difference between said rise time measurement and remeasurement, and means for determining from said difference the direction which the rotor was rotated comprise a programmed microprocessor.

13. A driver for polyphase brushless, DC motor having a plurality of stator coils and a rotor, comprising:
means for measuring the rise time of current on each of said stator coils with the rotor at rest;
means for applying a voltage to a determined coil, after the rise time of current on each of said stator coils has been measured, sufficient to produce at least a slight rotation of said rotor;
means for remeasuring of the rise time of current on at least a plurality of said stator coils with said rotor again at rest;
means for determining a difference between said rise time measurement and remeasurement, and
means for determining from said difference the direction which the rotor was rotated;
means for determining from said rise time measurement which one of said stator coils to apply a startup voltage;
and means for applying a startup voltage to said determined one of said stator coils.

14. The driver of claim 13 wherein said means for determining which one of said stator coils to apply a startup voltage, means for remeasuring the rise time of current, means for determining a difference between said rise time measurement and remeasurement, and means for determining from said difference the direction which the rotor was rotated comprise a programmed microprocessor.

* * * * *